(12) United States Patent
Myrah et al.

(10) Patent No.: US 8,732,381 B2
(45) Date of Patent: May 20, 2014

(54) SAS EXPANDER FOR COMMUNICATION BETWEEN DRIVERS

(75) Inventors: Michael G Myrah, Cypress, TX (US); Balaji Natrajan, Spring, TX (US); Joseph David Black, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 316 days.

(21) Appl. No.: 13/292,882

(22) Filed: Nov. 9, 2011

(65) Prior Publication Data

US 2013/0117767 A1 May 9, 2013

(51) Int. Cl.
 *G06F 13/00* (2006.01)
(52) U.S. Cl.
 USPC ............................ 710/316; 719/327; 710/112
(58) Field of Classification Search
 USPC ............................ 710/316; 719/327; 711/112
 See application file for complete search history.

(56) References Cited

U.S. PATENT DOCUMENTS

| | | | |
|---|---|---|---|
| 6,408,061 B1 | 6/2002 | Donak et al. | |
| 7,373,442 B2 * | 5/2008 | Seto | 710/100 |
| 8,296,513 B1 * | 10/2012 | Liu | 711/112 |
| 2005/0033911 A1 * | 2/2005 | Kitamura et al. | 711/111 |
| 2007/0300241 A1 | 12/2007 | Prakash et al. | |
| 2009/0007155 A1 * | 1/2009 | Jones et al. | 719/327 |
| 2009/0150643 A1 * | 6/2009 | Jones et al. | 711/203 |
| 2010/0017496 A1 | 1/2010 | Kimmel et al. | |
| 2010/0153617 A1 | 6/2010 | Miroshnichenko et al. | |
| 2011/0179214 A1 | 7/2011 | Goggin et al. | |
| 2013/0205061 A1 * | 8/2013 | Jinno et al. | 710/316 |

* cited by examiner

*Primary Examiner* — Diem Cao
(74) *Attorney, Agent, or Firm* — Arthur Ortega (57) ABSTRACT

A SAS expander that includes a virtual device manager and a communications manager. The virtual device manager is to generate a virtual device table comprising virtual device PHYs associated with virtual device drivers for host device drivers to allow communication between the host device drivers. The communications manager is to receive a request from a first host device driver of a first host to communicate with a second host device driver of a second host, and in response to receipt of the request, establish communication between the first host device driver and a virtual device PHY associated with a virtual device driver of the second host device driver.

14 Claims, 3 Drawing Sheets

SAS EXPANDER FOR COMMUNICATION BETWEEN DRIVERS

BACKGROUND

Serial attached small computer system interface (SAS) is a communications protocol for enabling communications between computer devices. In the SAS protocol, SAS devices include initiator devices, target devices, and expander devices. Initiator devices are devices that can begin a SAS data transfer, while target devices are devices to which initiator devices can transfer data. Expander devices are devices that can facilitate data transfer between multiple initiator devices and multiple target devices. The SAS protocol utilizes a point-to-point bus topology. Therefore, if an initiator device is required to connect to multiple target devices, a direct connection can be established between the initiator device and each individual target device to facilitate each individual data transfer between the initiator device and each individual target device. Expander devices can manage the connections and data transfer between multiple initiator devices and multiple target devices. A SAS fabric can include a network of initiator devices, target devices and expander devices.

BRIEF DESCRIPTION OF THE DRAWINGS

Certain examples are described in the following detailed description and in reference to the drawings, in which.

DETAILED DESCRIPTION OF SPECIFIC EXAMPLES

A explained above, a SAS fabric can include a network of initiator devices, target devices and expander devices. In one example, a SAS fabric can include an expander coupled to initiators such as host computers. The host computers may include host controllers and corresponding host device drivers to provide support for the host controllers. The present application provides techniques to allow the host device drivers to communicate with each other over a SAS fabric. It may be desirable for the host device drivers to communicate with each other the SAS fabric, as described in further detail below.

The techniques of the present application may be applicable to various computing environments. For example, a storage array may include hosts computers configured with dual controllers such as active/active controllers. Such controllers may allow both controller nodes to process input/output requests and provide a standby capability for the other active/active array controller. The controllers may need to communicate data between each other such as to transfer file system level data. The techniques of the present application may provide high bandwidth and low latency data transfer and communication between the controllers.

In another example, a storage array may include redundant array of independent disks (RAID) storage technology which can provide increased reliability and functions through redundancy. A host computer may include RAID technology because of performance gains and cost benefits with multi-core host processor architectures. This arrangement may include miniport drivers associated with the RAID technology which may now assume more responsibilities. These responsibilities may be extended to active/active controller configurations which have traditionally resided in host array controllers. The host may have drivers which may be provided with access to the same set of storage such as storage disk drives using a zoned SAS fabric. This would provide the driver associated with the host visibility to common storage, such as disk drives, but no visibility to each other. A need may arise where drivers residing on different hosts need to communicate with each other to exchange information, synchronize their local cache etc and the like. The present application provides techniques to allow the host drivers to communicate with each other over a SAS fabric.

In another example, the present application discloses techniques for facilitating communication between host device drivers over a SAS fabric. In one example, the SAS fabric may include a plurality of separate hosts containing SAS protocol enabled controllers having device drivers connected to the same SAS fabric. To facilitate communication between the host device drivers over the SAS fabric, the host device drivers and host controllers may need to be capable of operating as targets, that is, for example, to accept, process and respond to commands from other initiators such as other host device drivers. Once this configuration is established, it may be possible to facilitate communication between device drivers by exposing virtual targets in the SAS fabric.

In one example, the present application can provide a SAS expander that includes a virtual device manager and a communications manager. The virtual device manager can generate a virtual device table that includes virtual device PHYs associated with virtual device drivers for host device drivers to allow communication between the host device drivers. The communications manager can receive a request from a first host device driver of a first host to communicate with a second host device driver of a second host. In response to receipt of the request, the virtual manager can establish communication between the first host device driver and a virtual device PHY associated with a virtual device driver of the second host device driver. Such a technique of communicating over the SAS fabric may have advantages such as not requiring a separate communication link or protocol such as Ethernet.

Figure 1:
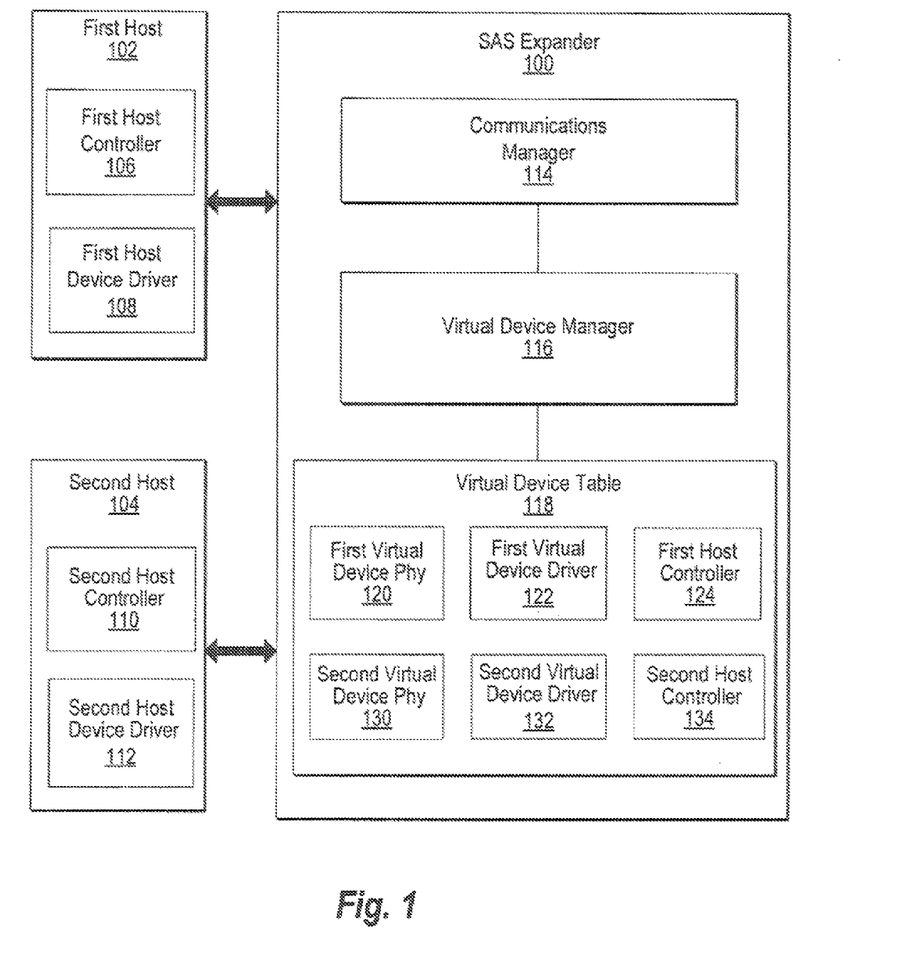
FIG. 1 is an example block diagram of a SAS expander for communication between drivers.

FIG. 1 is an example block diagram of a SAS fabric for communication between drivers. The SAS fabric may include a network of SAS protocol enabled devices including a SAS expander 100 capable of communicating with a plurality of SAS initiators such as a first host 102 and a second host 104. Although the system is presented in terms of an example system using an SAS Fabric architecture, this is for purposes of description only. Other system architectures, such as Storage Area Networks (SAN) or Direct Attached Networks (DAN), may also benefit from the techniques described herein. The first host 102 includes a first host controller 106 and a first host device driver 108. The second host 104 includes a second host controller 110 and a second host device driver 112. As explained below, the present application may provide techniques to allow host device drivers, such as first host device driver 108 and second host device driver 112, to communicate with each other over the SAS fabric.

The first host 102 can include a SAS enabled data processing device capable of communicating over a SAS fabric. The first host controller 106 can provide processing functionality to support first host 102. For example, first host controller 106 can include an array controller for managing storage arrays. The first host device driver 108 can provide first host controller 106 with support in the form of hardware, software or a combination thereof. In one example, first host 102 can be an initiator capable of generating multiple commands directed to storage resources associated with multiple targets (not shown). In another example, first host 102 can comprise a plurality of server computers with array controllers to enable the servers to access and communicate with other devices on the SAS fabric. The array controllers can comprise storage controllers such as disk array controllers which can manage physical disk drives and present them to the servers as logical units. In some examples, array controllers can implement RAID functionality and may be referred to as RAID controllers. The first host 102 can be an initiator device that can generate commands directed to expander 100. To facilitate communication between drivers over the SAS fabric, first host 102, including first host controller 106 and first host device driver 108, can be configured to operate as a target and accept, process and respond to commands from other SAS devices on SAS expander 100, such as second host 104. The functionality of second host 104 and its components is similar to that of first host 102 as described herein.

The first host 102 and second host 104 are shown in communication with SAS expander 100. However, it should be understood that a different number of hosts can be in communication with SAS expander 100. The first host 102 and second host 104 are shown as having a single host controller 106 and host device driver 108. However, it should be understood that first host 102 and second host 104 can be configured with a plurality of host controllers and host device drivers. Although not shown, SAS expander 100 can communicate with SAS targets. The targets may include any data processing devices capable of managing storage resources with functionality for storage of data and for subsequent retrieval by initiators such as first host 102 and second host 104. For example, targets may include storage drive bays which may contain storage drives, such as disk drives, solid state drives, optical drives, tape drives, and the like.

The SAS expander 100 includes a communications manager 114, a virtual device manager 116 and a virtual device table 118. The communications manager 114 can provide an interface for communicating with SAS devices over the SAS fabric. For example, communications manager 114 can provide an interface to communicate with first host 102 and second host 104. Although not shown, communications manager 114 can provide an interface to communicate with target devices such as storage devices capable of storing data and retrieving the stored data. For example, communications manager 114 can exchange data and commands with first host 102 and second host 104. In one example, communications manager 114 can receive from first host 102 a command such as a request from first host device driver 108 to communicate with second host device driver 112 of second host 104. The communications manager 114 can respond to receipt of the request by establishing communication between first host device driver 108 and second host device driver 112. The communications manager 114 can include physical PHYs which are specific to the SAS protocol and can represent physical devices for communication. The SAS expander 100 can include a plurality of ports associated with physical PHYs which can comprise electronic transceivers for exchanging data and requests or commands between the expander and initiators such as first host 102. On the other hand, a virtual PHY is a SAS protocol specific element that can represent a virtual device which is being emulated from a physical device to facilitate communication with SAS expander 100.

The virtual device manager 116 can manage virtual device table 118. The virtual device table 118 can comprise a plurality of entries with information to facilitate establishment of communication between initiators such as first host 102 and second host 104. In one example, virtual device table 118 includes entries with information for first host 102 such as first virtual device PHY 120, first virtual device driver 122 and first host controller 124. The first virtual device PHY 120 can represent a virtual PHY corresponding to first virtual device driver field 122. in one example, a virtual PHY is a SAS protocol specific element that can represent a virtual device which is being emulated from a physical device for communication. The first host controller 124 entry is a field that identifies first host controller 106 associated with first host 102. The virtual device manager 116 can generate entries in virtual device table 118 including virtual device PHYs associated with virtual device drivers for host device drivers to allow communication between the host device drivers. For example, for first host 102, as shown in FIG. 1, virtual device manager 116 can generate first host controller 124 entry which provides a reference to first virtual device PHY 120 which is associated with first virtual device driver 122 for the first host. In a similar manner to entries for first host 102, virtual device manager 116 can generate entries in virtual device table 118 for second host 104 including fields such as second virtual device PHY 130, second virtual device driver 132 and second host controller 134.

In one example, virtual device manager 116 can manage virtual device table 118 to allow first host device driver 108 to communicate with second host device driver 112, as explained below in further detail. In a similar manner, virtual device manager 116 can manage virtual device table 118 to allow second host device driver 112 to communicate with first host device driver 108. Although FIG. 1 shows virtual device table 118 as having a particular number of entries for first host 102 and second host 104, it should be understood that additional entries can be provided in the table. Furthermore, it should be understood that the arrangement of the fields in virtual device table 118 shown in FIG. 1 are for illustrative purposes and that a different arrangement can be provided.

The virtual device manager 116 in combination with communications manager 114 can control the operation of SAS expander 100. For example, communications manager 114 can receive SAS commands from initiators, such as from first host 102 and second host 104, to allow virtual device manager 116 to generate virtual device PHYs for virtual device table 118. To illustrate, communications manager 114 can receive SAS commands from first host 102 to allow virtual device manager 116 to generate for entries for the first host in virtual device table 118. These entries include first virtual device PHY 120 corresponding to first virtual device driver 122 and first host controller field 124 which identifies first host controller 106 residing on the first host. The virtual device manager 116 can assign unique SAS addresses to the virtual device PHYs. In this manner, virtual device manager 116 can use the SAS addresses to help establish communication between host device drivers and virtual device drivers. For example, virtual device manager 116 can assign a SAS address to first virtual device PHY 120 to allow future communication with first host device driver 108 and first virtual device driver 122.

The virtual device manager 116 can generate commands directed to devices which are coupled to SAS expander 100. For example, virtual device manager 116 can generate broadcast commands, such as SAS BROADCAST commands, to notify initiators, such as first host 102 and second host 104, that it has generated virtual device PHYs. The virtual device manager 116 can forward commands from a host device driver to a virtual device driver associated with the other host.

To illustrate, virtual device manager 116 can receive a command from first host device driver 108 which may be directed to second host device driver 112 residing on second host 104. The virtual device manager 116 can respond by forwarding the command from first host device driver 108 to second virtual device driver 132 associated with second host 104. The virtual device manager 116 can then forward the command to the second host device driver 112 residing on second host 104.

The communications manager 114 can receive commands from devices on SAS fabric. For example, communications manager 114 can receive SAS DISCOVER commands from initiators, such as first host 102 and second host 104. The communications manager 114 can respond by providing the initiators with any new information in virtual device table 118 such as virtual device drivers generated by the SAS expander. During the discovery process, the host controllers, such as second host controller 110, can build device tables with information comprising discovered devices on the SAS fabric. The host controller can use the information in the device table residing on the host when requesting to communicate with other host device drivers on the SAS expander 100. For example, first host device driver 108 can find address information of second host device driver 112 and use this information when generating a request to communicate with the second host device driver. The communications manager 114 can provide for communication between host device drivers associated with host controllers of hosts.

The present application can provide techniques that include access control features which can apply to SAS zone groups as part of a SAS fabric. Using virtual device PHYs to represent host device drivers may allow users, such as administrators, to set zoning permissions such that only certain devices may be allowed to communicate with the device drivers. For example, if there is a request for communication between a pair of device drivers, such as between first host device driver 108 and second host device driver 112, then virtual device PHYs representing the drivers in the fabric can be configured in a single SAS zone group. This may allow the two device drivers to discover and communicate with each other. However, other devices in the SAS fabric would receive a negative response, such as a SAS PHY VACANT response, in response to a discovery command, such as SMP DISCOVER command, from SAS expander 100 which is hosting the virtual device PHYs. Furthermore, to help limit logical unit (LUN) access exposed by a driver to only specific initiators, standard small computer system interface (SCSI) based ACCESS CONTROL techniques can be implemented by the device driver. In one example, the device driver could mask LUNs based on initiator SAS addresses. With the device drivers exposed in the SAS fabric residing behind virtual device driver PHYs, the unique SAS addresses assigned to the virtual device PHY can be used as the transport identifier to implement ACCESS CONTROL techniques.

The techniques of the present application can be applicable in other computer environments such as virtual machine environments. For example, SAS expander 100 may allow hosts to expose multiple device drivers in the SAS fabric. In a similar manner, multiple device drivers may be generated in a virtual machine environment. A virtual machine environment can include a virtual machine which can perform virtual and physical functions. For example, first host controller 106 can include a physical array controller which can be represented by a plurality of virtual array controllers. The virtual function can be performed by the virtual array controller which can reside on a virtual machine. The virtual machine can provide a virtual device driver on SAS expander 100 which can correspond to its virtual machine device driver. In the present application, a host controller, such as first host controller 106, can include an array controller which can generate a plurality of virtual device drivers on SAS expander 100, for example.

The configuration of the SAS fabric of FIG. 1 is for illustrative purposes and it should be understood that a different configuration can be employed to implement the techniques of the present application. For example, the functionality of communications manager 114 and virtual device manager 116 are shown as part of SAS expander 100, however, it should be understood that other configuration are possible. To illustrate, in one example, the functionality of communications manager 114 can be combined with virtual device manager 116. In another example, the functionality of communications manager 114 and virtual device manager 116 can be distributed among a plurality of devices located locally, remotely or a combination thereof. The functionality of SAS expander 100 and its components can be implemented in hardware, software, or a combination thereof.

Figure 2:
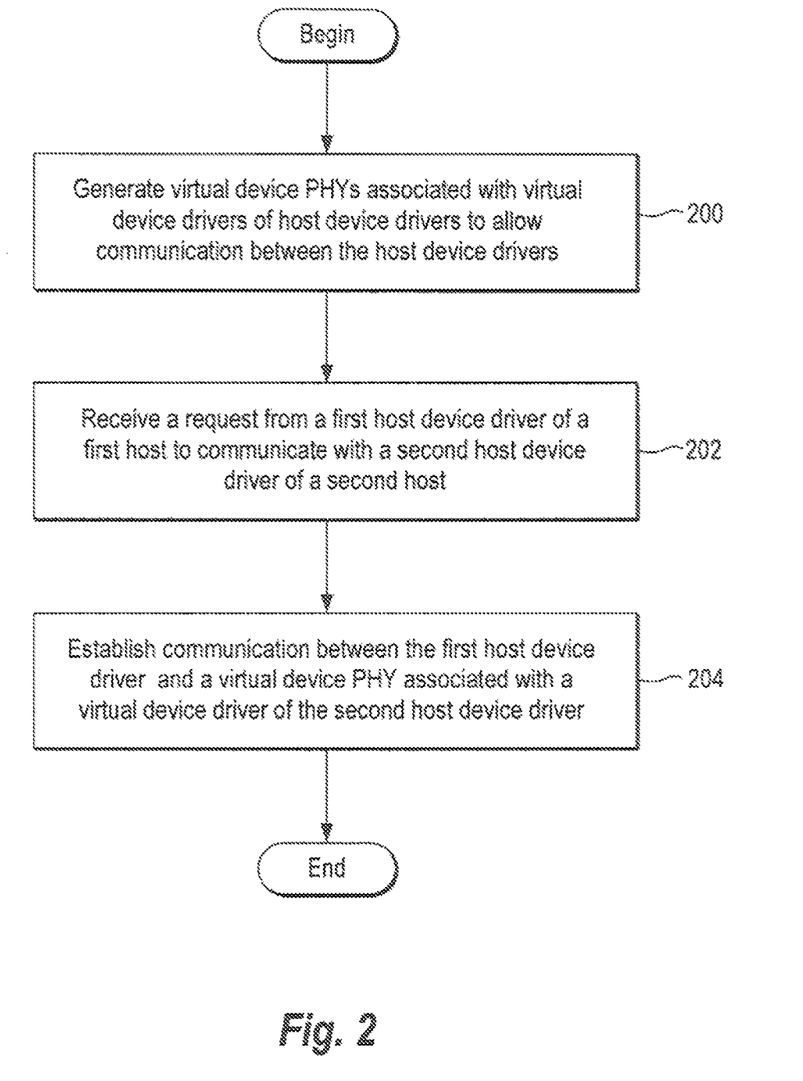
FIG. 2 is an example process flow diagram of a method of operating a SAS expander for communication between drivers.

FIG. 2 is an example process flow diagram of a method of operating SAS expander 100 for communication between drivers.

To illustrate, in one example, it can be assumed that first host 102 and second host 104 are coupled to SAS expander 100 as shown in FIG. 1. Further, it can be assumed that first host device driver 108 requests to communicate with second host device driver 112.

The method may begin at block 200, where SAS expander 100 generates virtual device PHYs associated with virtual device drivers of host device drivers to allow communication between the host device drivers. For example, communications manager 114 can receive SAS commands from first host 102 and second host 104. In one example, it can be further assumed that host device drivers, such as first host device driver 108 and second host device driver 112, can communicate with each other in a SAS fabric. The first host device driver 108 can send a proprietary command, at startup for example, to first host controller 106, which can then initiate the process to expose the first host device driver on the SAS fabric as a virtual device. Then, continuing with the example, first host controller 106 can then send to SAS expander 100 a command, such as a CREATE VIRTUAL DRIVER PHY, specifying that a virtual device PHY be created for first host device driver 108. The SAS expander 100 can respond by generating entries in virtual device table 118 including first virtual device PHY 120 and maintain a mapping of corresponding host controller 106 associated with the virtual device PHY. In a similar manner, second host controller 110 can cause SAS expander to generate entries in virtual device table 118 for second host device driver 112 including second virtual device PHY 130 The virtual device manager 116 can generate the other relevant entries in virtual device table 118 as shown in FIG. 1. The virtual device manager 116 can assign unique SAS addresses to the virtual device drivers associated with virtual device PHYs. In this manner, as explained below, a command from first host device driver 108 targeting second host device driver 112 can be routed or forwarded to the second host device driver. In this example, this can be achieved by having virtual device manager 116 find second virtual device driver 132 in virtual device table 118 and forward the command to the corresponding second host controller 110 for processing by second host device driver 112 residing on second host 104. The above process can be performed for all device drivers residing on hosts that are coupled to the SAS fabric.

Continuing with block 200, when virtual manager 116 generates entries in virtual device table 118, including entries corresponding to virtual device driver PHY's, the virtual device manager can send out a broadcast message, such as a standard SAS BROADCAST (CHANGE) primitive, on the SAS fabric notifying all initiators, such as hosts, that the initiators can perform discovery a process. The virtual device drivers can be discovered by host controllers connected to the SAS fabric using SAS discovery commands, such as standard serial management protocol (SMP) SMP DISCOVER command including issuing an INQUIRY commands, to the virtual devices. For example, first virtual device driver 122 can be discovered by second host controller 110 through the use of SAS discovery techniques. Likewise, second virtual device driver 132 can be discovered by first host controller 106 through the use of SAS discovery techniques. During the discovery process, the host controllers, such as second host controller 110, can build device tables of discovered devices. Furthermore, based on the techniques of the present application, the host controllers can now add virtual device drivers to its device tables. The information in the device tables residing on the hosts can be used by the hosts to discover which device drivers are available on the SAS fabric for communication.

There can be several methods that host device drivers can employ to discover virtual device drivers on the SAS fabric. In one example, a host controller, such as first host controller 106, can expose a virtual device driver associated with a virtual device PHY to host 102 as an unmasked SCSI peripheral device. In another example, a host device driver, such as first host device driver 108, can perform SAS discovery techniques, such as standard SMP discovery using SMP pass-through technique, on the corresponding host controller. In this case, the device driver can implement SMP discovery techniques. As virtual device drivers are discovered, the host device drivers can perform a broadcast process on each one to determine if the discovered device is another driver on the SAS fabric. For example, the broadcast process can include sending out broadcast commands, such as a standard SAS BROADCAST (CHANGE) primitive, on the SAS fabric notifying all initiators, such as hosts, that discovery is required. Next, processing then continues to block 202 below.

At block 202, SAS expander 100 receives a request from a first host device driver of a first host to communicate with a second host device driver of a second host. For example, first host device driver 108 can send a request to SAS expander 100 that it requests to communicate with second host device driver 112. The request from first host device driver 108 can include a frame of data with information identifying second host device driver 112. As explained below, in block 204, the SAS expander 100 can review this information to determine whether to establish communication between the host device drivers.

At block 204, SAS expander 100 establishes communication between the first host device driver and a virtual device PHY associated with a virtual device driver of the second host device driver. In one example, virtual device manage 116 will review the information in a frame of data from first host device driver 108 to determine whether to establish communication with the second host device driver 112. For example, virtual device manager 116 can employ virtual device table 118 to determine whether to allow first host device driver 108 to communicate with second host device driver 112. The virtual device manager 116 may review the information in virtual device table 118 such as second virtual device PHY 130 associated with second virtual device driver 132 of second host controller 134. That is, communication from first host device driver 108 to second host device driver 112 can be directed to second virtual device driver 132 based on the virtual device table 118 mapping of the second virtual device driver and the second host device driver. In one example, first host device driver 108 can build a frame of data that includes destination information including specifying the second host device driver 112 and the SAS address of second virtual device PHY 130 which is associated with the second host device driver. The first host device driver 108 can then send the frame of data to SAS expander 100. The virtual table 118 provides a mapping between second virtual device driver 132 and second host device driver 112 which is residing on second host 104.

Continuing with block 204, virtual device manager 116 can then examine the frame of data including the destination information and find that the SAS address corresponds to second virtual device PHY 130. The virtual device manager 116 can then check virtual device table 118 and find that second virtual device PHY 130 corresponds to second virtual device driver 132 and second host controller 134, of second host 104. In this case, virtual device manager 116 can determine that first host device driver 108 is requesting to communicate with second host device driver 112. The virtual manager 116 can then establish communication between first host device driver 108 and second host device driver 112 and forward any data and commands (e.g., frame of data) from the first host device driver to the second host device driver. The second host 104 can then receive the frame of data. The second host 104 may examine the frame of data and determine that the destination information specifies that the data is intended for second host device driver 112. To facilitate this mapping or translation, second host 104 may include a device table (not shown) that can map destination information to a particular device driver. In this case, second host 104 may determine that the frame of data is directed to second host device driver 112 and not to second host controller 110 or other device. That is, the SAS address specifies the destination as second host device driver 112 corresponding to second virtual device driver 132 and not that of second host controller 110. The second host device driver 112 can then receive the frame of data and process the data accordingly. Therefore, in one example, SAS expander 100 is configured to allow first host device driver 108 to communicate with second host device driver 112 through second virtual device driver 132 and directing communication from the first host device driver to second host device driver.

The above method describes an example of operation in which first host device driver 108 requests communication with second host device driver 112. However, it should be understood that the techniques of the present application can be employed in other scenarios such as second host device driver 112 requesting to communicate with first host device driver 108.

The technique of the present application may be applicable to virtual machine environments. For instance, if there are multiple virtual controllers and one physical host controller, it may be possible to also associate the virtual drivers with the virtual controllers. In this manner, multiple virtual machine host device drivers can communication with each other on the same physical machine.

Figure 3:
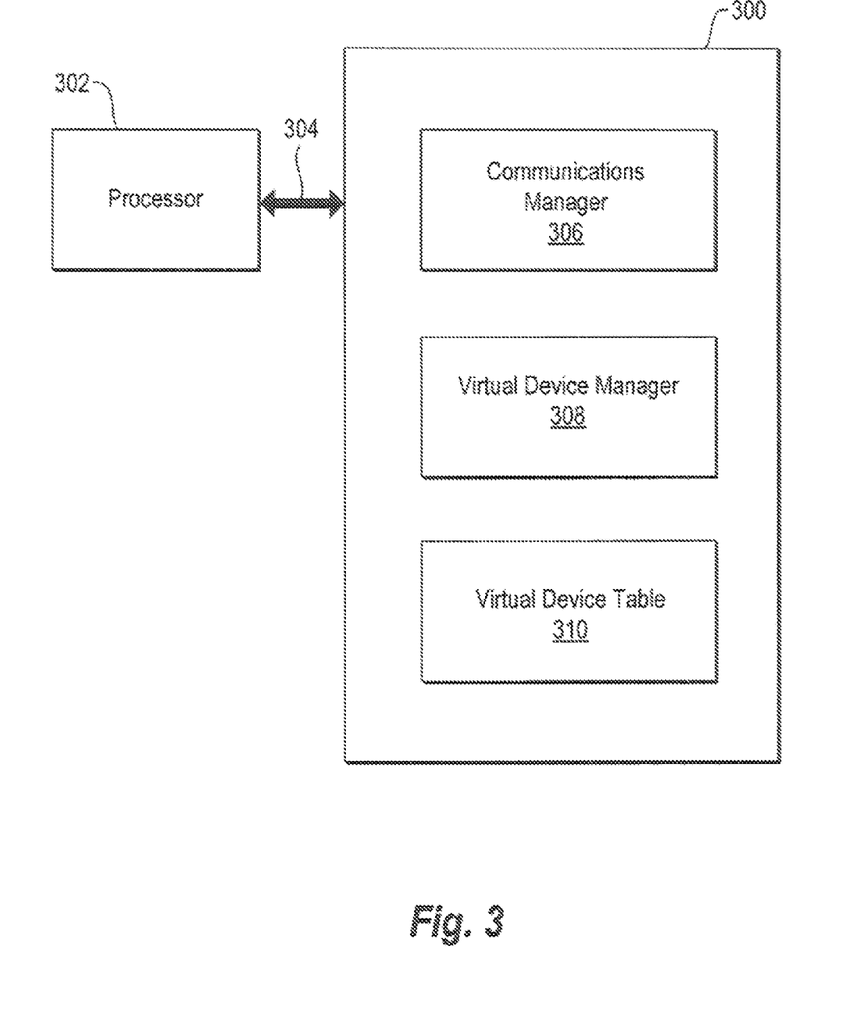
FIG. 3 is an example block diagram showing a non-transitory, computer-readable medium that stores instructions for operating a SAS expander for communication between drivers.

FIG. 3 is an example block diagram showing a non-transitory, computer-readable medium that stores code for operating a SAS expander. The non-transitory, computer-readable medium is generally referred to by the reference number 300 and may be included in SAS expander 100 of the SAS fabric described in relation to FIG. 1. The non-transitory, computer-readable medium 300 may correspond to any typical storage device that stores computer-implemented instructions, such as programming code or the like. For example, the non-transitory, computer-readable medium 300 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

A processor 302 generally retrieves and executes the instructions stored in the non-transitory, computer-readable medium 300 to operate the SAS expander in accordance with an example. In an example, the tangible, machine-readable medium 300 can be accessed by the processor 302 over a bus 304. A first region 306 of the non-transitory, computer-readable medium 300 may include communications manager functionality as described herein. A second region 308 of the non-transitory, computer-readable medium 300 may include virtual device manager functionality as described herein. A third region 310 of the non-transitory, computer-readable medium 300 may include virtual device table structure and functionality as described herein.

Although shown as contiguous blocks, the software components can be stored in any order or configuration. For example, if the non-transitory, computer-readable medium 300 is a hard drive, the software components can be stored in non-contiguous, or even overlapping, sectors.

What is claimed is:

1. A Serial attached small computer system interface (SAS) expander embodied at least in part in computer executable instructions stored on non-transitory computer-readable medium and executable by a processor and comprising:
   a virtual device manager to generate a virtual device table comprising virtual device PHYs associated with virtual device drivers for host device drivers to allow communication between the host device drivers, wherein the virtual device PHYs and the virtual device drivers are located at the expander and the host device drivers are located at the host;
   a communications manager to receive SAS commands from hosts to allow the virtual device manager to generate the virtual device PHYs and to receive a request from a first host device driver of a first host to communicate with a second host device driver of a second host, and in response to receipt of the request, consult the virtual device table to establish communication between the first host device driver and a virtual device PHY associated with a virtual device driver of the second host device driver, and wherein the virtual device manager to assign unique SAS addresses to the virtual device PHYs.

2. The expander of claim 1, wherein the virtual device manager to generate SAS BROADCAST commands to notify hosts that are in communication with the SAS expander that it has generated virtual device PHYs.

3. The expander of claim 1, wherein the communications manager to receive SAS DISCOVER commands from hosts to allow the SAS expander to respond by providing the hosts with information regarding the virtual device drivers generated by the SAS expander.

4. The expander of claim 1, wherein the virtual device manager to forward commands from the first host device driver to the virtual device driver of the second host.

5. The expander of claim 1, wherein the communications manager to communicate with host device drivers associated with host controllers of the hosts.

6. A method of communication with a Serial attached small computer system interface (SAS) expander comprising:
   receiving SAS commands from hosts to allow a virtual device manager to generate virtual device PHYs;
   generating a virtual device table comprising virtual device PHYs associated with virtual device drivers for host device drivers to allow communication between the host device drivers, wherein the virtual device PHYs and the virtual device drivers are located at the expander and the host device drivers are located at the host;
   assigning unique SAS addresses to the virtual device PHYs;
   receiving a request from a first host device driver of a first host to communicate with a second host device driver of a second host; and
   In response to receipt of the request, consulting the virtual device table for establishing communication between the first host device driver and a virtual device PHY associated with a virtual device driver of the second host device driver.

7. The method of claim 6, further comprising generating SAS BROADCAST commands to notify hosts that are in communication with the SAS expander that it has generated virtual device PHYs.

8. The method of claim 6, further comprising receiving SAS DISCOVER commands from hosts to allow the SAS expander to respond by providing the hosts with information regarding the virtual device drivers generated by the SAS expander.

9. The method of claim 6, further comprising forwarding messages from the first host device driver to the virtual device driver of the second host.

10. The method of claim 6, further comprising communicating with host device drivers associated with host controllers of the hosts.

11. A non-transitory computer-readable medium having computer executable instructions stored thereon to operate a Serial attached small computer system interface (SAS) expander, the instructions are executable by a processor to:
    receive SAS commands from hosts to allow a virtual device manager to generate virtual device PHYs;
    generate a virtual device table comprising virtual device PHYs associated with virtual device drivers for host device drivers to allow communication between the host device drivers, wherein the virtual device PHYs and the virtual device drivers are located at the expander and the host device drivers are located at the host;
    assign unique SAS addresses to the virtual device PHYs;
    receive a request from a first host device driver of a first host to communicate with a second host device driver of a second host; and
    In response to receipt of the request, consult the virtual device table to establish communication between the first host device driver and a virtual device PHY associated with a virtual device driver of the second host device driver.

12. The computer readable medium of claim 11 further comprising instructions that if executed cause a processor to:
    generate SAS BROADCAST commands to notify hosts that are in communication with the SAS expander that it has generated virtual device PHYs.

13. The computer readable medium of claim 11 further comprising instructions that if executed cause a processor to:
    receive SAS DISCOVER commands from hosts to allow the SAS expander to respond by providing the hosts with information regarding the virtual device drivers generated by the SAS expander.

14. The computer readable medium of claim 11 further comprising instructions that if executed cause a processor to: forward commands from the first host device driver to the virtual device driver of the second host.

\* \* \* \* \*

UNITED STATES PATENT AND TRADEMARK OFFICE
CERTIFICATE OF CORRECTION

PATENT NO. : 8,732,381 B2  Page 1 of 1
APPLICATION NO. : 13/292882
DATED : May 20, 2014
INVENTOR(S) : Michael G Myrah et al.

It is certified that error appears in the above-identified patent and that said Letters Patent is hereby corrected as shown below:

In the Claims

In column 10, line 16, in Claim 6, delete "In" and insert -- in --, therefor.

In column 10, line 52, in Claim 11, delete "In" and insert -- in --, therefor.

Signed and Sealed this
Thirteenth Day of January, 2015

Michelle K. Lee
*Deputy Director of the United States Patent and Trademark Office*